United States Patent
Oota et al.

(10) Patent No.: US 8,646,836 B2
(45) Date of Patent: Feb. 11, 2014

(54) VEHICLE SEAT

(75) Inventors: Hiroki Oota, Inazawa (JP); Atsuki Sasaki, Nagoya (JP); Takeshi Nishiura, Nissin (JP); Yasuhiko Niimi, Handa (JP); Jun Yamaoka, Aichi-ken (JP)

(73) Assignee: Toyota Boshoku Kabushiki Kaisha, Aichi-Ken (JP)

(*) Notice: Subject to any disclaimer, the term of this patent is extended or adjusted under 35 U.S.C. 154(b) by 71 days.

(21) Appl. No.: 13/017,251

(22) Filed: Jan. 31, 2011

(65) Prior Publication Data

US 2011/0187165 A1     Aug. 4, 2011

(30) Foreign Application Priority Data

Feb. 2, 2010 (JP) ................................. 2010-021003

(51) Int. Cl.
    *A47C 7/72*          (2006.01)
(52) U.S. Cl.
    USPC ............. 297/180.13; 297/180.12; 297/180.14
(58) Field of Classification Search
    USPC .......................... 297/180.12, 180.13, 180.14
    See application file for complete search history.

(56) References Cited

U.S. PATENT DOCUMENTS

| | | | |
|---|---|---|---|
| 5,102,189 A | 4/1992 | Saito et al. | |
| 5,924,766 A * | 7/1999 | Esaki et al. | 297/180.13 |
| 7,581,584 B2 * | 9/2009 | Yoneno et al. | 165/202 |
| 7,873,451 B2 * | 1/2011 | Hartmann et al. | 701/36 |
| 2002/0041116 A1 * | 4/2002 | Bogisch et al. | 297/180.1 |
| 2006/0261645 A1 | 11/2006 | Bargheer et al. | |
| 2007/0214800 A1 | 9/2007 | Kadle et al. | |
| 2007/0278835 A1 | 12/2007 | Bargheer et al. | |
| 2009/0015043 A1 * | 1/2009 | Macht et al. | 297/180.14 |
| 2009/0031742 A1 | 2/2009 | Seo et al. | |
| 2009/0295200 A1 | 12/2009 | Ito et al. | |

FOREIGN PATENT DOCUMENTS

| | | |
|---|---|---|
| CN | 2891607 | 4/2007 |
| DE | 102009013257 | 10/2009 |
| JP | 11-137371 | 5/1999 |
| JP | 2002187471 | 7/2002 |
| JP | 2006-523478 | 10/2006 |
| JP | 2008-273404 | 11/2008 |
| WO | WO 2008/023942 | * 2/2008 |
| WO | 2009/028985 | 3/2009 |

OTHER PUBLICATIONS

U.S. Appl. No. 12/951,215 to Hiroki Oota, filed Nov. 22, 2010.
China Office action, dated Jan. 7, 2013, along with an english translation thereof.
Japan Office action, dated Oct. 22, 2013 along with an english translation thereof.

* cited by examiner

*Primary Examiner* — David Dunn
*Assistant Examiner* — Richard Lowry
(74) *Attorney, Agent, or Firm* — Greenblum & Bernstein, P.L.C.

(57) ABSTRACT

A vehicle seat is provided. The vehicle seat includes a seat main body, and a duct that is provided in the seat main body. The duct includes an inlet port through which air is supplied, a first communication pipe which is branched from the inlet port and communicates with a first outlet port, and a second communication pipe which is branched from the inlet port and communicates with a second outlet port. The duct is provided with a heating device which is configured to supply or absorb heat to or from air flowing through at least one of the first communication pipe and the second communication pipe so as to generate a temperature difference between air discharged from the first outlet port and air discharged from the second outlet port.

11 Claims, 5 Drawing Sheets

VEHICLE SEAT

BACKGROUND OF THE INVENTION

1. Field of the Invention

The present invention relates to a vehicle seat that is mounted on a vehicle and the like.

2. Description of the Related Art

In a related-art, a vehicle seat has been known which has a seat back and a provided in the seat back. JP-A-2006-523478 describes a vehicle seat, in which a blower is provided at a lower side of a duct and a heating element is provided in the duct. Accordingly, the blower supplies air to the duct, the air is heated by the heating element and the heated air is discharged from an outlet port of the duct to the area around a neck of a passenger. JP-A-2002-187471 describes a vehicle seat having a seat back which is provided with a fan and a plurality of ducts extending from the fan. Accordingly, the fan supplies air to the respective ducts and the air is discharged from outlet ports of the respective ducts.

SUMMARY OF THE INVENTION

However, the vehicle seat described in JP-A-2006-523478 has only one duct. Although the vehicle seat described in JP-A-2002-187471 has the plurality of outlet ports, the air discharged from the outlet ports have the same temperature with each other. Therefore, a vehicle seat is demanded in which a plurality of outlet ports are provided and air having temperatures different from each other is discharged from the outlet ports in order to improve pleasantness of the seat.

According to an illustrative embodiment of the present invention, there is provided a vehicle seat comprising: a seat main body; and a duct that is provided in the seat main body. The duct includes an inlet port through which air is supplied, a first communication pipe which is branched from the inlet port and communicates with a first outlet port, a second communication pipe which is branched from the inlet port and communicates with a second outlet port. The duct is provided with a heating device which is configured to supply or absorb heat to or from air flowing through at least one of the first communication pipe and the second communication pipe so as to generate a temperature difference between air discharged from the first outlet port and air discharged from the second outlet port.

According to another illustrative embodiment, there is provided a vehicle seat comprising: a seat main body; a blowing device which is configured to blow air; a duct provided in the seat main body, the duct including a base pipe which communicates with the blowing device, a first communication pipe which is branched from the base pipe and communicates with a first outlet port, and a second communication pipe which is branched from base pipe and communicates with a second outlet port; and a heating device which can be turned on and off. The heating device is configured to generate a temperature difference between air discharged from the first outlet port and air discharged from the second outlet port when the heating device is turned on, and does not generate the temperature difference between air discharged from the first outlet port and air discharged from the second outlet port when the heating device is turned off.

Accordingly, the air discharged from the first outlet port and the air discharged from the second outlet port have the different temperature by the heating device. Furthermore, since the heating device is provided in the seat main body, the heating device is positioned closer to the first and second outlet ports, compared to an air conditioning apparatus provided to a vehicle main body. Thus, the temperature difference can be surely and effectively generated between the air discharged from the first outlet port and the air discharged from the second outlet port. Thereby, the air that is adjusted to have appropriate temperature corresponding to each part of a passenger can be discharged from each position. Accordingly, it is possible to improve pleasantness of the seat.

DETAILED DESCRIPTION

Figure 1:
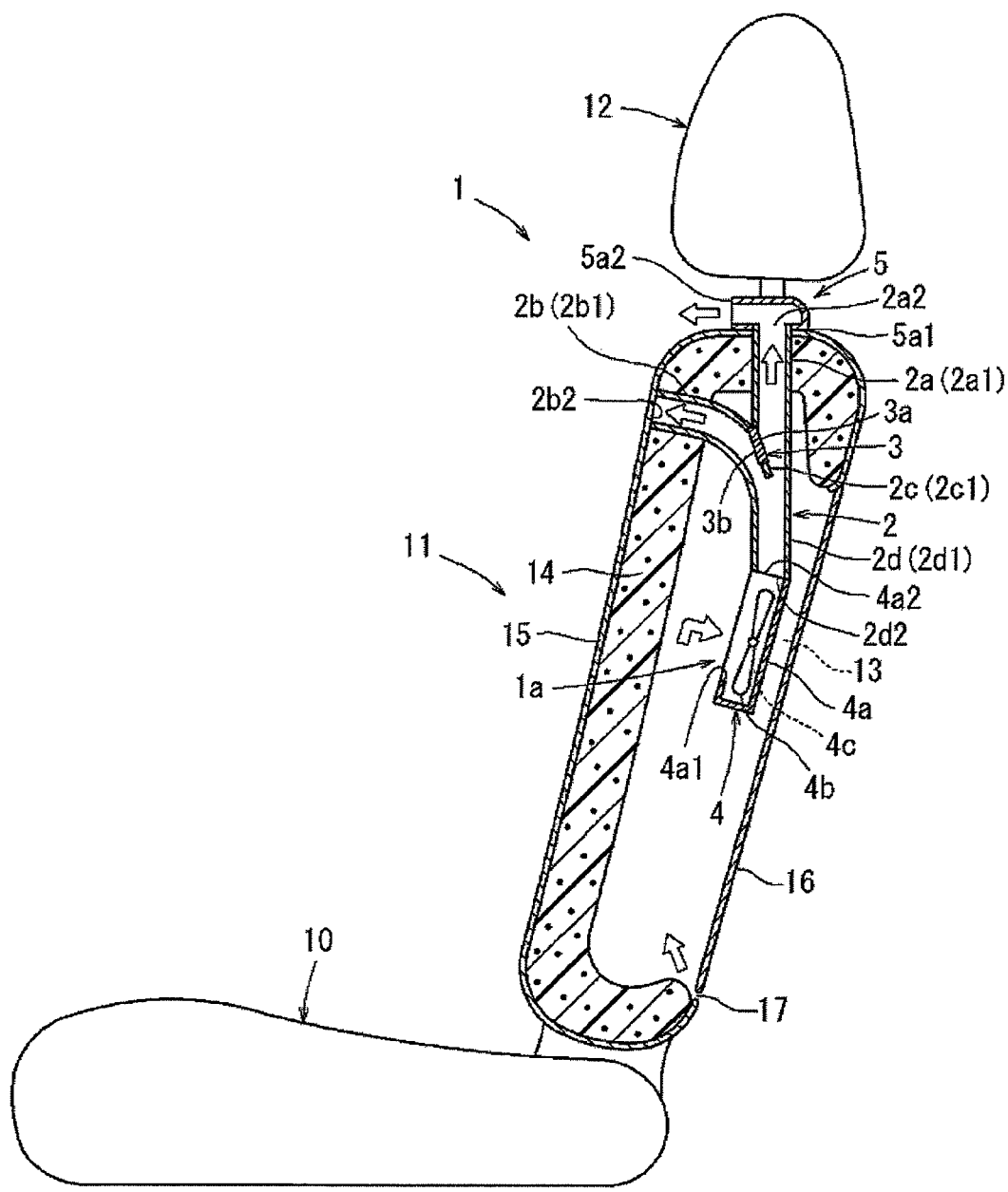
FIG. 1 is a partial side sectional view of a vehicle seat according to an illustrative embodiment.

An illustrative embodiment of the present invention will be described with reference to FIG. 1. A vehicle seat 1 is mounted on a vehicle and the like and has a seat cushion 10, a seat back (seat main body) 11 and a headrest 12. The seat back 11 is attached to a rear part of the seat cushion 10 and is erected. The headrest 12 is attached to an upper part of the seat back 11.

The seat back 11 has a frame 13, a pad 14 and an air conditioning device 1a. The frame 13 is attached to the rear part of the seat cushion 10 so that the angle between the seat back 11 and the seat cushion 10 can be adjusted. The pad 14 is made of elastic material such as urethane foam and is mounted on the frame 13. A cover member 15 is attached to the pad 14. A front surface and a peripheral part of the pad 14 are covered by the cover member 15. A backside member 16 is attached to a backside of the pad 14, so that the backside of the pad 14 is covered by the backside member 16, and a gap is formed between the pad 14 and the backside member 16.

As shown in FIG. 1, the air conditioning device 1a has a duct 2, a heating device 3 and a blowing device 4. The blowing device 4 has a housing 4a, a fan 4b that is rotatably supported by the housing 4a and a motor 4c that rotates the fan 4b. The housing 4a is attached to the frame 13. A front side part of the housing 4a is formed with an opening 4a1 that allows air to be supplied into the housing 4a. A connection part 4a2, to which the duct 2 is connected, is provided to an upper part of the housing 4a.

The duct 2 is made of elastic member such as rubber. As shown in FIG. 1, the duct 2 integrally has a base pipe 2d, a first communication pipe 2a and a second communication pipe 2b. The base pipe 2d has a hollow shape and configures a base passage 2d1 that communicates with the blowing device 4. The base pipe 2d has an inlet port 2d2 at a lower part therefore. The inlet port 2d2 is connected to the blowing device 4. A branch pipe 2c is provided to an upper part of the base pipe 2d. The branch pipe 2c has a partition part (branch passage) 2c1 that divides the base passage 2d1 into a plurality of flow passages (for example, two flow passages).

The first communication pipe 2a has a hollow shape and configures a first communication passage 2a1 that is branched from the base passage 2d1. The first communication passage 2a1 extends upwardly from the base passage 2d1 and communicates with a first outlet port 2a2 that is formed at an end portion of the first communication pipe 2*a*. The first communication pipe 2*a* penetrates the pad 14 and the cover member 15 and is opened at an upper surface of the seat back 11. The air discharged from the first outlet port 2*a*2 is discharged from the upper surface of the seat back 11.

As shown in FIG. 1, a discharging pipe 5 is connected to an upper end portion of the first communication pipe 2*a*. The discharging pipe 5 has a connection part 5*a*1 that is connected to the first communication pipe 2*a* and an outlet port 5*a*2 that is opened forward. Accordingly, the air having passed through the first communication pipe 2*a* and the discharging pipe 5 can be discharged to a rear part of a neck of a user who sits on the seat 1.

The second communication pipe 2*b* has a hollow shape and configures a second communication passage 2*b*1 that is branched from the base passage 2*d*1. The second communication passage 2*b*1 extends in a front-upper direction from the base passage 2*d*1 and communicates with a second outlet port 2*b*2 that is formed at an end portion of the second communication pipe 2*b*. The second communication pipe 2*b* penetrates the pad 14. The second outlet port 2*b*2 is opened to the backside of the cover member 15 and is also directed toward the front of the seat back 11. The air discharged from the second outlet port 2*b*2 passes through the cover member 15 and is discharged to a shoulder or a part of a back of the user who sits on the seat 1.

As shown in FIG. 1, the heating device 3 has a heat absorption part 3*a* and a heat radiation part 3*b*. The heating device 3 is a heat exchanger using a Peltier effect or the like, in which the heat absorption part 3*a* absorbs heat and the heat radiation part 3*b* radiates heat by flowing current in a predetermined direction. The heating device 3 is mounted on the branch pipe 2*c* such that the heat absorption part 3*a* is opposed to the first communication passage 2*a*1 and the heat radiation part 3*b* is opposed to the second communication passage 2*b*1.

When the fan 4*b* is rotated, the air is suctioned into the seat back 11 through the gap 17 between the backside member 16 and the cover member 15. The fan 4*b* supplies the air to the base passage 2*d*1 of the duct 2 and the air is branched from the base passage 2*d*1 by the branch passage 2*c*1. The air having flowed to the first communication passage 2*a*1 flows by the heat absorption part 3*a* and is heat-absorbed and thus cooled by the heat absorption part 3*a*. The cooled air is discharged from the first outlet port 2*a*2 via the first communication passage 2*a*1. The air having flowed to the second communication passage 2*b*1 flows by the heat radiation part 3*b* and is heat-supplied and thus heated by the heat radiation part 3*b*. The heated air is discharged from the second outlet port 2*b*2 via the second communication passage 2*b*1.

In winter when it is low temperature, the heating device 3 and the blowing device 4 are turned on, as described above. On the other hand, in summer when it is high temperature, the heating device 3 is turned off and the blowing device 4 is turned on. Thereby, the air having the same temperature as atmosphere can be discharged from the first outlet port 2*a*2 and the second outlet port 2*b*2. By doing so, the wind is supplied to a user who sits on the seat 1.

As described above, the seat 1 has the duct 2 that is provided in the seat main body (seat back 11). The duct 2 has the inlet port 2*d*2 to which the air can be supplied, the first communication pipe 2*a* that is branched from the inlet port 2*d*2 and communicates with the first outlet port 2*a*2 and the second communication pipe 2*b* that is branched from the inlet port 2*d*2 and communicates with the second outlet port 2*b*2. The duct 2 is provided with the heating device 3 that supplies or absorbs heat to or from the air flowing through the first communication pipe 2*a* and the second communication pipe 2*b* and thus generates the temperature difference between the air discharged from the first outlet port 2*a*2 and the air discharged from the second outlet port 2*b*2.

Accordingly, the temperature difference can be generated between the air discharged from the first outlet port 2*a*2 and the air discharged from the second outlet port 2*b*2 by the heating device 3. Furthermore, the heating device 3 is provided in the seat main body (seat back 11). Therefore, the heating device 3 is positioned closer to the first outlet port 2*a*2 and the second outlet port 2*b*2, compared to an air conditioning apparatus provided to a vehicle main body. Thus, the temperature difference can be surely and effectively generated between the air discharged from the first outlet port 2*a*2 and the air discharged from the second outlet port 2*b*2. Thereby, the air that is adjusted to have appropriate temperature corresponding to each part of a passenger can be discharged from each position. Accordingly, it is possible to improve pleasantness of the seat 1.

In addition, the heating device 3 is a heat exchanger and has the heat absorption part 3*a* that absorbs heat from the air flowing through the first communication pipe 2*a* and the heat radiation part 3*b* that radiates heat to the air flowing through the second communication pipe 2*b*. Accordingly, the air flowing through the first communication pipe 2*a* is cooled by the heat absorption part 3*a*. On the other hand, the air flowing through the second communication pipe 2*b* is heated by the heat radiation part 3*b*. Thereby, the temperature difference is generated between the air discharged from the first outlet port 2*a*2 and the air discharged from the second outlet port 2*b*2. In addition, both two actions of the heating device 3, i.e., the heat absorption by the heat absorption part 3*a* and the heat radiation by the heat radiation part 3*b* are used to generate the temperature difference in the air. Therefore, heat discharge by the heating device 3 is reduced. Thereby, the energy efficiency is improved when causing the temperature difference in the air by the heating device 3.

In addition, as shown in FIG. 1, the first outlet port 2*a*2 is provided above the second outlet port 2*b*2 and the temperature of the air that is discharged from the first outlet port 2*a*2 is lower than that of the air that is discharged from the second outlet port 2*b*2. Accordingly, the air of low temperature that is discharged from the first outlet port 2*a*2 is retrained from moving downwardly by the air of high temperature that is discharged from the second outlet port 2*b*2. On the other hand, the air of high temperature that is discharged from the second outlet port 2*b*2 is retrained from moving upwardly by the air of low temperature that is discharged from the first outlet port 2*a*2. Therefore, the temperature of the discharged air is maintained to have a predetermined gradient. Thereby, it is possible to form the temperature difference in the air surrounding the seat main body. Accordingly, it is possible to improve pleasantness of the seat 1.

As shown in FIG. 1, the air cooled by the heating device 3 is discharged from the first outlet port 2*a*2 to around a neck of a user who sits on the seat 1. Therefore, it is possible to prevent the user from having diminished consciousness, which may be caused because a head of the user is too hot. In the meantime, the air heated by the heating device 3 is discharged from the second outlet port 2*b*2 to a back adjacent to a shoulder of the user. Thus, it is possible to warm the body of the user without causing the user to have diminished consciousness.

Other Illustrative Embodiments

While the present invention has been shown and described with reference to certain exemplary embodiments thereof, it will be understood by those skilled in the art that various changes in form and details may be made therein without departing from the spirit and scope of the invention as defined by the appended claims.

Figure 2:
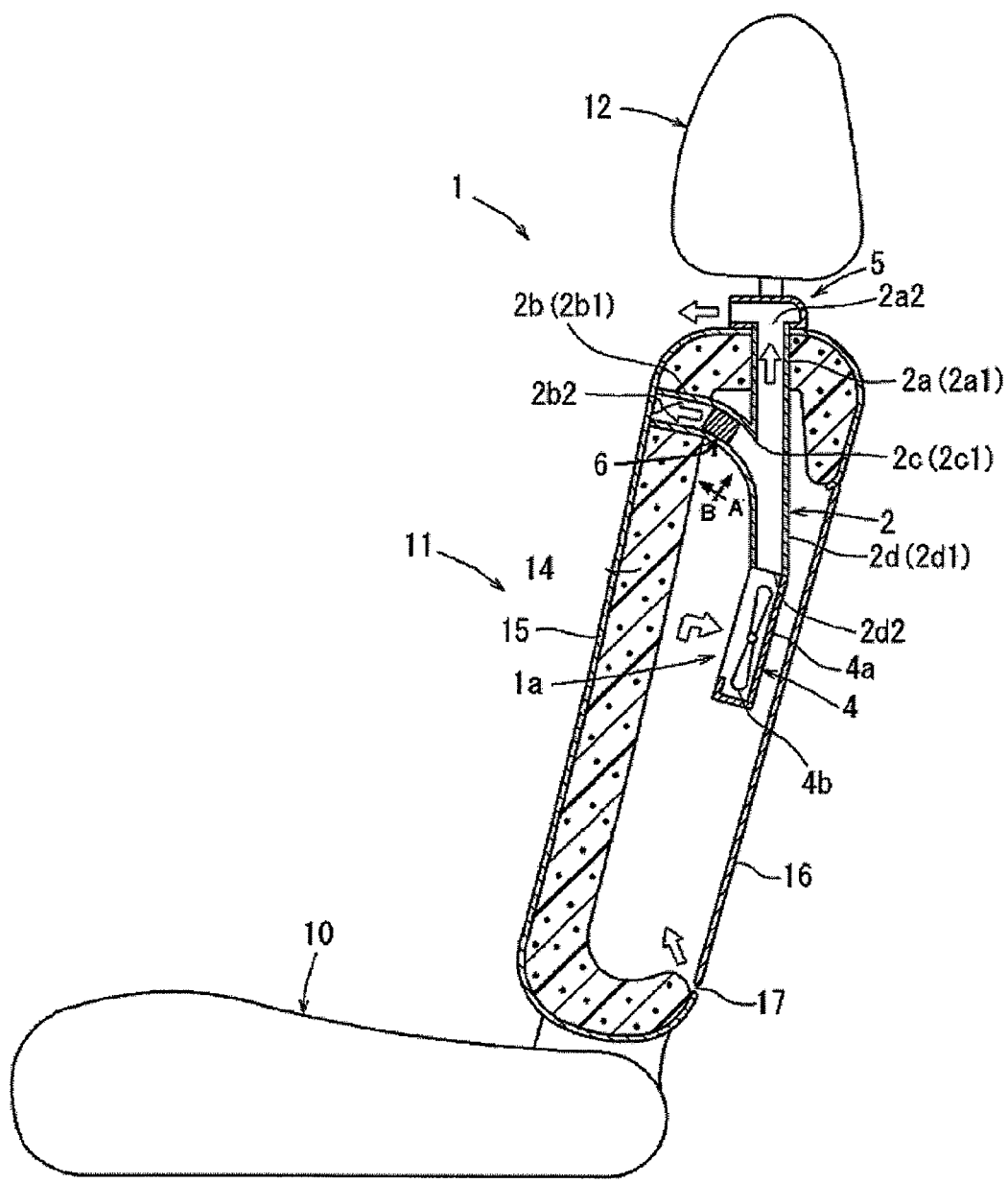
FIG. 2 is a partial side sectional view of a vehicle seat according to another illustrative embodiment.
Figure 3:
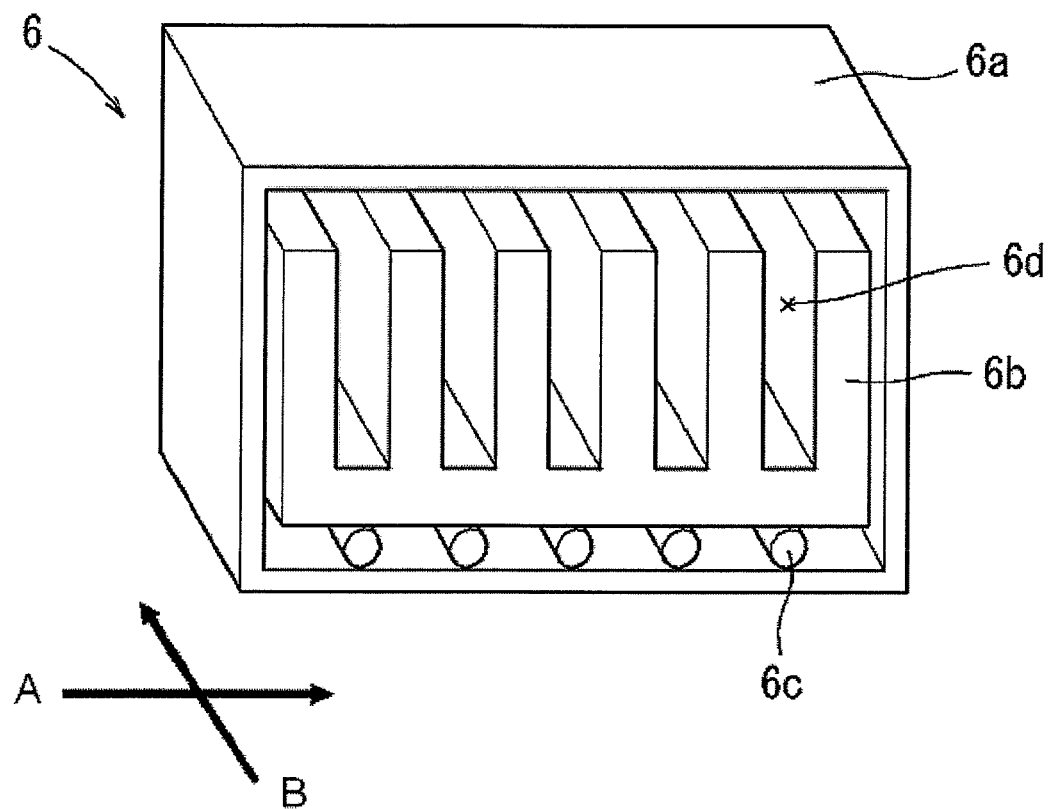
FIG. 3 is a sectional perspective view of a heater according to the other illustrative embodiment.

For example, the air conditioning device 1a may have a heating device 6 shown in FIGS. 2 and 3, instead of the heating device 3 shown in FIG. 1. The heating device 6 is a heating element that generates heat by flowing current therein, and has a housing 6a, a heat sink 6b and heat wires 6c, as shown in FIG. 3. The heating device 6 is provided as show in the arrow A and arrow B in FIGS. 2 and 3.

As shown in FIG. 3, the housing 6a has a container shape and both axial end portions thereof are opened. The heat sink 6b has a plurality of fins and the heat wires 6c are contacted to a lower surface of the heat sink 6b. The heat wires 6c are made of nichrome wires and the like and generate Joule's heat by flowing current therethrough. The heat generated from the heat wires 6c is transferred to the heat sink 6b, which is then supplied from the heat sink 6b to the air passing through a gap 6d between the heat sink 6b and the housing 6a, so that the air is heated.

As shown in FIG. 2, the heating device 6 is provided in the second communication pipe 2b. When the fan 4b is rotated, the fan 4b supplies the air into the base passage 2d1 of the duct 2. The air that is branched from the base passage 2d1 and flows to the first communication passage 2a1 is discharged from the first outlet port 2a2. The air that is branched from the base passage 2d1 and flows to the second communication passage 2b1 is heated by the heating device 6. The heated air is discharged from the second outlet port 2b2.

In winter when it is low temperature, the heating device 6 and the blowing device 4 are turned on, as described above. On the other hand, in summer when it is high temperature, the heating device 6 is turned off and the blowing device 4 is turned on. Thereby, the air having the same temperature as atmosphere can be discharged from the first outlet port 2a2 and the second outlet port 2b2. Accordingly, the wind is supplied to a user who sits on the seat 1.

Figure 4:
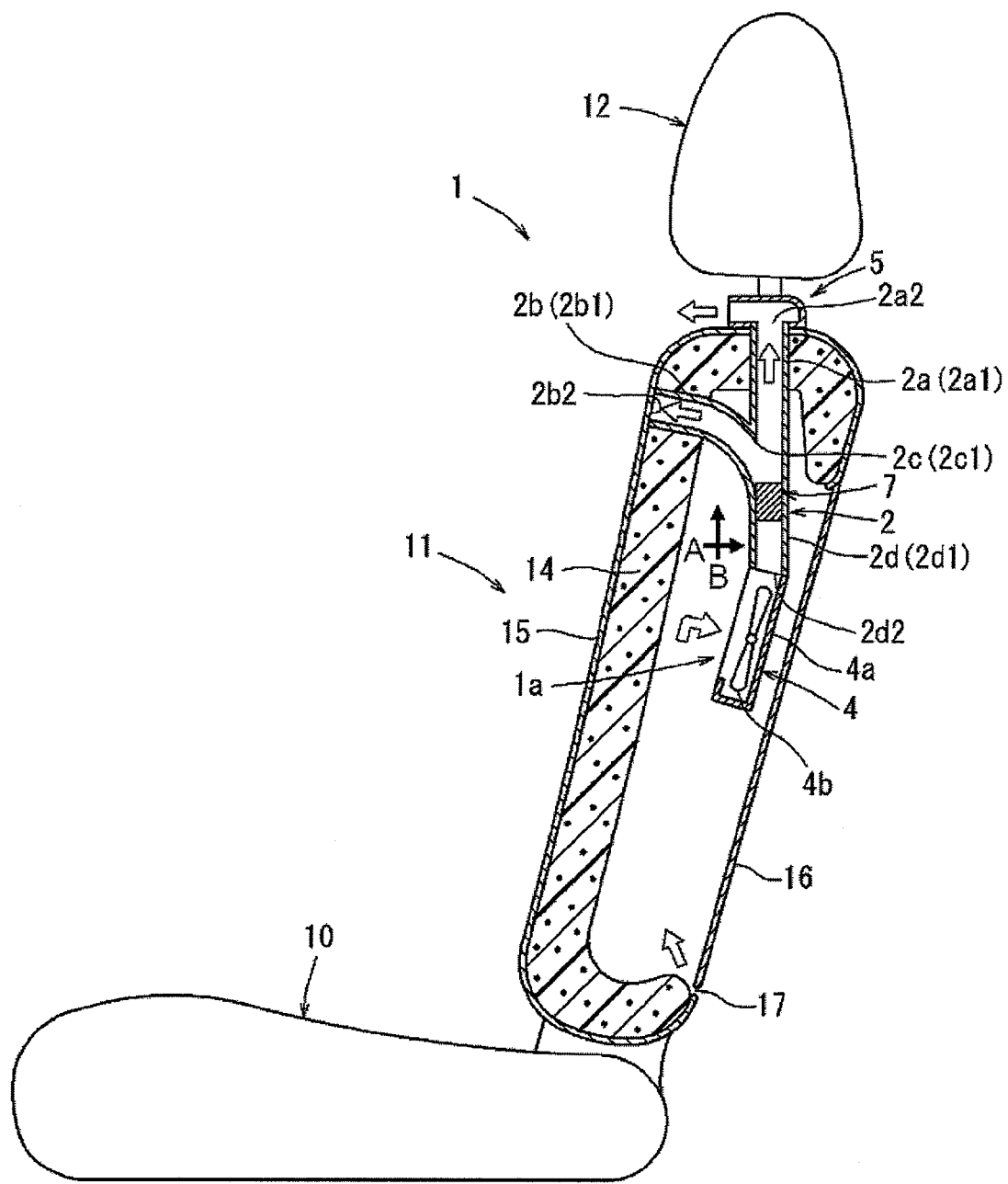
FIG. 4 is a partial side sectional view of a vehicle seat according to a further illustrative embodiment.
Figure 5:
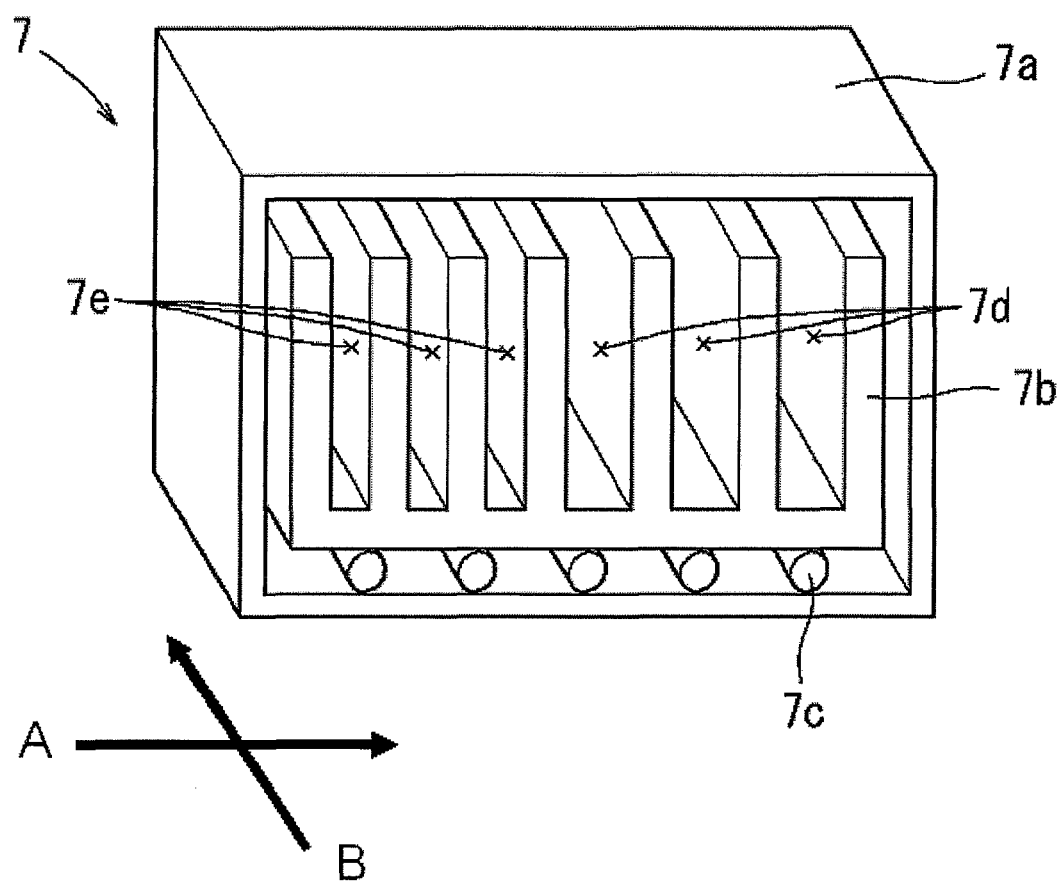
FIG. 5 is a sectional perspective view of a heater according to the further illustrative embodiment.

In addition, the air conditioning device 1a may have a heating device 7 shown in FIGS. 4 and 5, instead of the heating device 3 shown in FIG. 1. The heating device 7 is a heating element and has a housing 7a, a heat sink 7b and heat wires 7c, as shown in FIG. 5. The heating device 7 is provided as shown in the arrow A and the arrow B in FIGS. 4 and 5.

As shown in FIG. 5, the housing 7a has a container shape and both axial end portions thereof are opened. The heat sink 7b has a plurality of fins that are provided at a first interval 7d and a plurality of fins that are provided at a second interval 7e narrower than the first interval 7d. As shown in FIG. 4, the heating device 7 is provided in the base pipe 2d such that the fins having the first interval 7d are provided at a side of the first communication pipe 2a and the fins having the second interval 7e are provided at a side of the second communication pipe 2b.

Therefore, when the air passes through the heating device 7, the temperature difference is generated in the air. The air having low temperature passes through the first communication pipe 2a and is apt to be discharged from the first outlet port 2a2. On the other hand, the air having high temperature passes through the second communication pipe 2b and is apt to be discharged from the second outlet port 2b2. As a result, the temperature difference is generated between the air discharged from the first outlet port 2a2 and the air discharged from the second outlet port 2b2.

Further, the air conditioning device 1a shown in FIGS. 1, 2 and 4 is provided in the seat back 1. However, the air conditioning device 1a may be provided in the seat cushion (seat main body) 10. In addition, the duct 2 shown in FIGS. 1, 2 and 4 is a separate member from the pad 14. However, the duct may be partially or entirely configured by the pad.

Further, the heating device 3 shown in FIG. 1 is a heat exchanger using a Peltier effect. However, the heating device may be another heat exchanger having a heat absorption part and a heat radiation part. In addition, the heating devices 6, 7 shown in FIGS. 2 and 4 have the heat wires 6c, 7c shown in FIGS. 3 and 5, which serve as heat generating elements. However, the heating device may have a planar heating element (PTC) that serves as a heat generating element. In addition, the heating device 6 shown in FIG. 2 is a heat generating element that generates heat. However, the heating device may be a heat absorption element that absorbs heat and may be provided in the first communication pipe 2a and the like.

Further, the blowing device 4 shown in FIGS. 1, 2 and 4 is provided in the seat main body (seat back 11). However, it may be also possible that the blowing device is mounted at the outside of the seat main body, for example, vehicle main body and the air is supplied from the blowing device to the duct.

Further, the first outlet port 2a2 shown in FIGS. 1, 2 and 4 upwardly discharges the air from the upper surface of the seat back 11. However, it may be also possible that the first outlet port discharges the air from the front or side of the seat cushion and preferably discharges the air from a more upward position than the second outlet port.

Further, the heating device 7 shown in FIG. 4 generates the temperature difference in the air passing through the heating device 7 by the intervals of the fins. However, the heating device 7 may have a heat generating element whose temperature can be partially adjusted or a heat absorption element whose heat absorption can be partially adjusted. Thereby, the temperature difference can be generated in the air having passed through the heating device 7.

Alternatively, the heating device 7 may be positioned at the second communication pipe 2b in the base pipe 2d, so that a gap may be formed at the second communication pipe 2b. Thereby, the air of high temperature is apt to be discharged from the first outlet port 2a2 via the first communication pipe 2a and the air of low temperature is apt to be discharged from the second outlet port 2b2 via the second communication pipe 2b. As a result, the temperature difference is generated between the air discharged from the first outlet port 2a2 and the air discharged from the second outlet port 2b2.

Further, two outlet ports 2a2, 2b2 are provided in the above-described illustrative embodiment. However, three or more of outlet ports may be provided, and outlet ports may be provided at any positions corresponding to the back, the armpit, or the waist of a user who sits on the seat 1. Additionally, the positional relationship of the outlet ports may be horizontal instead of the vertical as in the above-described illustrative embodiment. The outlet port which discharges higher temperature air may be provided lower than another outlet port which discharges lower temperature air, as desired.

What is claimed is:
1. A vehicle seat comprising:
a seat main body comprising a seat back;
a duct that is provided in the seat main body,
wherein the duct includes:
an inlet port through which air is supplied;
a first communication pipe which branches from the inlet port and communicates with a first outlet port, so that a portion of the air supplied from the inlet port flows into the first communication pipe; and
a second communication pipe which branches from the inlet port and communicates with a second outlet port, so that an other portion of the air supplied from the inlet port flows into the second communication pipe; and a heating device positioned in the duct between the branches defining the first communication pipe and the second communication pipe, wherein the first outlet port and the second outlet port are each is disposed at a passenger side surface of the seat main body to discharge air in a seated passenger direction, wherein the heating device generates a temperature difference between air discharged from the first outlet port to the passenger side surface of the seat main body and air discharged from the second outlet port to the passenger side surface of the seat main body, and wherein the first outlet port is disposed on an upper surface of the seat back.

2. The vehicle seat according to claim 1, wherein the heating device is a heat exchanger including a heat absorption part that absorbs heat from air flowing through the first communication pipe and a heat radiation part that radiates heat to air flowing through the second communication pipe.

3. The vehicle seat according to claim 1, wherein the first outlet port is provided at a higher position than the second outlet port, and wherein a temperature of the air discharged from the first outlet port is lower than a temperature of the air discharged from the second outlet port by the heating device.

4. The vehicle seat according to claim 1, further comprising:

a blowing device which blows the air toward the first and second outlet ports from the inlet port.

5. A vehicle seat comprising:

a seat main body comprising a seat back;

a blowing device which is configured to blow air;

a duct provided in the seat main body, the duct including:
   a base pipe which communicates with the blowing device;
   a first communication pipe which branches from the base pipe and communicates with a first outlet port, so that a portion of the air supplied from the inlet port flows into the first communication pipe; and
   a second communication pipe which branches from base pipe and communicates with a second outlet port, so that an other portion of the air supplied from the inlet port flows into the second communication pipe; and a heating device which can be turned on and off, the heating device being positioned in the duct between the branches defining the first communication pipe and the second communication pipe, wherein the first outlet port and the second outlet port are each disposed at a passenger side surface of the seat main body to discharge air in a seated passenger direction, wherein the heating device generates a temperature difference between air discharged from the first outlet port to the passenger side surface of the seat main body and air discharged from the second outlet port to the passenger side surface of the seat main body when the heating device is turned on, and does not generate the temperature difference between air discharged from the first outlet port to the passenger side surface of the seat main body and air discharged from the second outlet port to the passenger side surface of the seat main body when the heating device is turned off, and wherein the first outlet port is disposed on an upper surface of the seat back.

6. The vehicle seat according to claim 1 wherein a discharging pipe is connected to the first outlet port disposed on the upper surface of the seat back to discharge air frontwardly, and the second outlet port is disposed on a seating side surface of the seat back.

7. The vehicle seat according to claim 5, wherein a discharging pipe is connected to the first outlet port disposed on the upper surface of the seat back to discharge air frontwardly, and the second outlet port is disposed on a seating side surface of the seat back.

8. The vehicle seat according to claim 1, wherein the heating device is positioned between the branches of the duct in the seat back.

9. The vehicle seat according to claim 5, wherein the heating device is positioned between the branches of the duct in the seat back.

10. The vehicle seat according to claim 1, wherein the heating device is positioned at a junction of the first communication pipe and the second communication pipe.

11. The vehicle seat according to claim 5, wherein the heating device is positioned at a junction of the first communication pipe and the second communication pipe.

* * * * *